(12) United States Patent
Felten et al.

(10) Patent No.: US 7,695,272 B2
(45) Date of Patent: Apr. 13, 2010

(54) DEVICE FOR PRODUCING A POLYMERIZABLE SYNTHETIC MATERIAL OPTICAL LENS

(75) Inventors: Yohann Felten, Charenton le Pont (FR); Marc Huard, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 69 days.

(21) Appl. No.: 11/518,438

(22) Filed: Sep. 11, 2006

(65) Prior Publication Data

US 2007/0065539 A1  Mar. 22, 2007

(30) Foreign Application Priority Data

Sep. 13, 2005  (FR)  ................... 05 09338

(51) Int. Cl.
*B29D 11/00* (2006.01)
*B29C 45/20* (2006.01)
*B29C 45/46* (2006.01)

(52) U.S. Cl. ........................ 425/567; 425/566; 425/569; 425/589; 425/467; 425/470; 425/808; 264/328.9

(58) Field of Classification Search .............. 425/174.4, 425/185, 560, 571, 395, 438, 466–470, 808, 425/812, DIG. 30, 47, 542, 568, 461, 567, 425/569, 589, 464, 562–566; 249/82, 109, 249/127, 128, 139, 154, 175; 264/1.32, 1.38, 264/2.2, 2.3, 313, 2.5, 1.1, 328.1, 328.9; 65/38, 43

See application file for complete search history.

(56) References Cited

U.S. PATENT DOCUMENTS 3,675,888 A * 7/1972 Scaramucci ................. 249/57
3,894,710 A * 7/1975 Sarofeen ..................... 249/117
3,938,775 A * 2/1976 Sarofeen ..................... 249/102
4,089,102 A * 5/1978 Soper et al. ................ 29/527.5
4,693,446 A * 9/1987 Orlosky ..................... 249/53 R
4,959,002 A * 9/1990 Pleasant ................... 425/192 R
5,127,814 A * 7/1992 Johnson et al. ............. 425/130
5,160,749 A * 11/1992 Fogarty ...................... 425/412

(Continued)

FOREIGN PATENT DOCUMENTS

EP  545720 A1 * 6/1993

(Continued)

*Primary Examiner*—Philip C Tucker
*Assistant Examiner*—Dimple N Bodawala
(74) *Attorney, Agent, or Firm*—Young & Thompson

(57) ABSTRACT

A device for producing a polymerizable synthetic material optical lens, including a closure member (12) that is adapted to grip two molding shells (14A, 14B) circumferentially to define a molding cavity (15) in conjunction with the shells (14A, 14B), the closure member (12) including a synthetic material wall (123) adapted to come into contact with the molding shells (14A, 14B) and the closure member (12) incorporating a molding material introduction passage (125) discharging into the molding cavity (15) through a casting opening (126); characterized in that the closure member (12) includes a seal (40) that forms the contact wall (123) and the introduction passage (125), which joint (40) is formed of an elastomer material and of a rigid insert (43) at least part of which has the elastomer material molded over it, the introduction passage (125) being inside the insert (43).

20 Claims, 5 Drawing Sheets

U.S. PATENT DOCUMENTS

| | | | | |
|---|---|---|---|---|
| 5,316,700 | A * | 5/1994 | Soye et al. | 264/1.1 |
| 5,514,214 | A * | 5/1996 | Joel et al. | 118/52 |
| 5,547,618 | A | 8/1996 | Magne et al. | |
| 5,605,656 | A * | 2/1997 | Sasano | 264/1.1 |
| 5,611,969 | A * | 3/1997 | Cano et al. | 264/2.5 |
| 5,662,839 | A * | 9/1997 | Magne | 264/1.38 |
| 6,103,148 | A * | 8/2000 | Su et al. | 264/1.38 |
| 6,319,433 | B1 * | 11/2001 | Kohan | 264/1.32 |
| 6,419,860 | B1 * | 7/2002 | Magne | 264/1.38 |
| 6,579,476 | B2 * | 6/2003 | Boryslawski et al. | 264/1.1 |
| 6,730,244 | B1 * | 5/2004 | Lipscomb et al. | 264/1.38 |
| 6,969,248 | B1 * | 11/2005 | Huard et al. | 425/564 |
| 7,275,397 | B2 * | 10/2007 | Taft et al. | 65/102 |
| 2004/0150125 | A1 * | 8/2004 | Huard | 264/1.1 |
| 2004/0258939 | A1 * | 12/2004 | Su et al. | 428/515 |
| 2004/0262792 | A1 * | 12/2004 | Huard et al. | 264/1.32 |
| 2005/0179148 | A1 * | 8/2005 | Tridon et al. | 264/1.32 |
| 2005/0200033 | A1 * | 9/2005 | Kadota et al. | 264/1.31 |
| 2007/0057397 | A1 * | 3/2007 | Duis et al. | 264/102 |

FOREIGN PATENT DOCUMENTS

| | | |
|---|---|---|
| EP | 1 440 780 | 7/2004 |
| EP | 1 440 788 | 7/2004 |
| EP | 1504869 A1 * | 2/2005 |
| JP | 2004291606 A * | 10/2004 |
| WO | WO 93/21010 | 10/1993 |
| WO | WO 03/078144 A1 * | 9/2003 |
| WO | WO 03/084728 A1 * | 10/2003 |

* cited by examiner

US 7,695,272 B2

DEVICE FOR PRODUCING A POLYMERIZABLE SYNTHETIC MATERIAL OPTICAL LENS

FIELD OF THE INVENTION

The invention relates to the production of optical lenses, more particularly, although not exclusively, ophthalmic lenses.

These lenses can be made from polymerizable synthetic materials, generally called organic materials, initially in the liquid state and solidified by polymerization, in particular by exposure to light (photopolymerization) and/or by heating (thermo-polymerization).

BACKGROUND OF THE INVENTION

Various devices for producing an optical lens made from this kind of material are already known in the art that include a closure member adapted to grip two molding shells circumferentially to define a molding cavity in conjunction with said shells. In some devices, the closure member is an adhesive tape applied to the edges of the two molding shells. In other devices it is an annular elastomer seal.

International application WO 93/21010 describes a device in which the closure member is a flexible annular seal fitted around one of the molding shells with a rigid clamp fixed around the flexible seal to reinforce it. The second molding shell is then inserted in the flexible seal by a carriage which positions it at the required distance from the first shell, the carriage then being locked in position. A source of molding material is connected to the molding cavity by a flexible conduit having a frustoconical end engaged in a small hole formed in the lower portion of the seal.

International application WO 03/078144 also describes a device in which the closure member is a flexible annular seal incorporating a hole for filling the molding cavity, this hole being formed in the upper portion of the seal and receiving a nozzle for introducing the molding material, to be more precise an assembly comprising the nozzle for introducing the polymerizable material and another nozzle that is used at the end of filling to aspirate surplus polymerizable material.

There is also known from European patent EP 0 715 946, and from its counterpart U.S. Pat. No. 5,547,618, a device described hereinafter with reference to FIGS. 1 to 3 of the appended drawings, in which:

FIG. 1 is a perspective view of the device;

FIGS. 2A, 2B, 2C and 2D are views to a smaller scale similar to that of FIG. 1 showing successive operations of using the device; and FIG. 3 is a perspective view to the same scale as FIG. 1 showing the removal from the mold of the optical lens produced by the device.

The lens 10 shown in FIG. 3 is produced by the device 11. It is a blank for eyeglass lenses, for example, and would subsequently have its periphery trimmed to the required shape for fitting it into an eyeglass frame.

Here the general contour of the lens or blank 10 is circular.

The device 11 includes two jaws 12' and 12" which are adapted to grip conjointly between them the edges of two molding shells 14A and 14B disposed substantially parallel to each other, to constitute a mold 13, forming with respect to these molding shells 14A and 14B a closure member 12 defining with them the required molding cavity 15.

Here the jaw 12' is fixed and the jaw 12" is mobile.

The molding shells 14A and 14B have internal surfaces (which face each other when the mold is assembled) whose geometry corresponds to that required for the lens to be produced.

Let $E_A$ and $E_B$ be the thicknesses of the molding shells 14A and 14B along their edge 16 and let $E_C$ be the distance between them required to constitute the molding cavity 15.

The interior surface 18 of each of the jaws 12' and 12" is generally semicylindrical, following the radius of the peripheral contour of the molding shells 14A and 14B.

The jaws 12' and 12" are interengaged with a common frame 19, formed here by two lateral flanges 20 and a crossmember 21 connecting the lateral flanges 20 together at one of their ends. The lateral flanges 20 extend vertically and parallel to each other, and the crossmember 21 extends horizontally at their upper end.

The two jaws 12' and 12" are staggered vertically on the frame 19, along the lateral flanges 20, the axis of their interior surfaces 18 therefore being horizontal.

The mold that the jaws 12' and 12" form with the shells 14A and 14B therefore also has a horizontal axis.

The jaw 12' is fixed to the frame 19, here screwed to it, and the jaw 12" is slidably interengaged with grooves 22 provided for this purpose on the frame 19, to be more precise on the internal face of the lateral flanges 20.

Each of the jaws 12' and 12" is formed by a solid metal block.

The interior surface 18 of each of the jaws 12' and 12" has a synthetic material covering 23 that is fixed by means of a semicircular clamp 24 provided at each of the curved ends of the surfaces 18.

The distance D between the two clamps 24 is greater than the sum of the thicknesses $E_A$ and $E_B$ of the molding shells 14A and 14B and the distance $E_C$ between them.

The lower jaw 12' has a bore 25 passing completely through it, forming a casting opening 26 for the molding cavity 15 where it opens onto its interior surface 18. The upper jaw 12" also has a bore 28 passing completely through it and forming a vent.

Here, the casting opening 26 is at the lowest point on the interior surface 18 of the lower jaw 12' and the bore 28 in the upper jaw 12" opens onto the interior surface 18 of that jaw at its highest point.

The jaw 12" is driven by two double-acting cylinders 29 disposed parallel to each other.

The body 30 of each cylinder 29 is carried by the crossmember 21 of the frame 19 and its piston rod 31 is coupled to the mobile jaw 12".

The bore 25 in the fixed jaw 12' is connected to a pipe 32 for connecting the molding cavity 15 to any kind of supply of molding material (not shown).

The use of the device 11 is described next.

Initially, the mold 13 is assembled.

To this end, the upper jaw 12" is moved away from the lower jaw 12', the molding shells 14A and 14B are fitted to the lower jaw 12' by simply nesting them in the interior surface 18 of that jaw, on edge, spaced from each other and parallel to each other, the distance $E_C$ between them corresponding to that required for the molding cavity 15 to be formed (FIG. 2A).

Merely nesting the molding shells 14A and 14B in the interior surface 18 of the jaw 12' is sufficient to retain them.

The double-acting cylinders 29 then lower the jaw 12" until its interior surface 18 presses on the edge of the molding shells 14A and 14B (FIG. 2B).

With the mold 13 closed in this way, it can be filled via the pipe 32, the necessary quantity of molding material being introduced into it by pumping means adapted to ensure a continuous feed, i.e. a smooth feed, of molding material to the molding cavity 15.

Polymerization of the material placed in the mold in this way is then initialized by exposing it to light.

To this end the device 11 is associated with a source 33 of radiation that is offered up in line with one of the molding shells 14A and 14B, here the shell 14A (FIG. 2C).

Here the radiation source 33 is a source of ultraviolet radiation and the molding shell 14A is of glass at least partially transparent to ultraviolet radiation.

When at least initial polymerization of the optical lens 10 to be obtained has been effected, the mold 13 is opened by raising the upper jaw 12" by means of the double-acting cylinders 29, after which the block 34 consisting of the optical lens 10 and the shells 14A and 14B gripping the lens 10 is removed from the lower jaw 12' (FIG. 2D).

After completion of polymerization of the molded material, if necessary, the molding shells 14A and 14B are removed from the optical lens 10 (FIG. 3).

There are known from European patent applications 1 440 780 and 1 440 788 and from corresponding US patent applications 2004/0150125 and 2004/0262792, respectively, a device similar to the device 11 that has just been described but which includes, for connecting the molding cavity 15 to the supply of molding material, instead of a simple bore 25 to which the pipe 32 is directly connected, a filler device including a valve and a nozzle: the valve is mounted underneath the jaw such as 12' and the nozzle is disposed in the jaw, the valve having a flow passage for the molding material whose inlet orifice communicates with the pipe such as 32 and whose outlet orifice communicates with the nozzle, which has an interior passage having the same function as the bore 25.

There is finally known in the art a machine conforming to European patent applications EP 1 440 780 and EP 1 440 788 just referred to in which the assembly of the nozzle and the covering such as 23 of the jaw such as 12' is effected by adhesive bonding, the covering such as 23 being cut to form a casting opening such as 26 in line with the interior passage of the nozzle.

SUMMARY OF THE INVENTION

The invention aims to provide a device of the same kind, i.e. a device whose closure member includes a passage for introducing the polymerizable material into the molding cavity, that is particularly simple, convenient and reliable both to manufacture and to use.

To this end it proposes a device for producing a polymerizable synthetic material optical lens, including a closure member that is adapted to grip two molding shells circumferentially to define a molding cavity in conjunction with said shells, said closure member includes a synthetic material wall adapted to come into contact with said molding shells and incorporates a molding material introduction passage discharging into the molding cavity through a casting opening, which device is characterized in that said closure member includes an elastomer material seal that forms said contact wall and said introduction passage and a rigid insert at least part of which has said elastomer material molded over it, said introduction passage being inside said insert.

The synergy between the insert and the elastomer material resulting from overmolding means that the introduction passage is conformed in a particularly precise and reproducible way by an easy manufacturing operation (molding) that produces a seal offering good performance in terms of reliability and durability.

Thus the seal of the invention is particularly advantageous compared to a seal in which the introduction passage is obtained only from the elastomer material alone or from juxtaposing and adhesively bonding an elastomer material contact wall and a relatively rigid nozzle for introducing the molding material.

Said casting opening is preferably molded into said elastomer material.

The casting opening therefore has the advantages mentioned above, in particular with regard to simplicity of manufacture, precision and a reproducible conformation, the fact that this opening is formed in the elastomer material avoiding any discontinuity of the contact wall liable to degrade the quality of the lenses manufactured or to introduce limitations as to the thickness of the edges of the optical lenses to be molded.

According to other features of the invention preferred for reasons of simplicity, convenience and reliability of manufacture and use:

said casting opening is buttonhole-shaped;
said introduction passage has a portion that converges towards said casting opening that is entirely delimited by elastomer material;
said introduction passage includes a recess opposite said casting opening that extends to a shoulder surface and a portion of said shoulder surface that converges to said casting opening;
said insert has an internal surface over the whole of which the elastomer material is molded;
said insert has an internal surface over which is molded a layer of elastomer material of constant thickness;
said seal includes a body forming said contact wall and a stem including said insert projecting from a face of said body opposite said molding cavity;
said insert forms at least a portion of the lateral external surface of said stem;
said portion of the lateral external wall of said stem formed by said body carries a screwthread;
said insert includes a body over part of which said elastomer material is molded and a head over the whole of which said elastomer material is molded;
said head includes an annular rib between two grooves;
said head includes an end situated at half the thickness of a body forming said contact wall;
said seal includes a gutter-shaped body forming said contact wall and rims each flanking a respective rectilinear end of said body and projecting radially from the face opposite said molding cavity; and/or
each of said rims has a face aligned with an edge of said body, said face and said edge together forming a surface having a sawtooth section.

BRIEF DESCRIPTION OF THE DRAWINGS

The explanation of the invention continues next with the following description of one embodiment of the invention, given by way of illustrative and nonlimiting example, and with reference to the drawing figures of the appended drawings, in which.

DETAILED DESCRIPTION OF THE INVENTION

Figure 1:
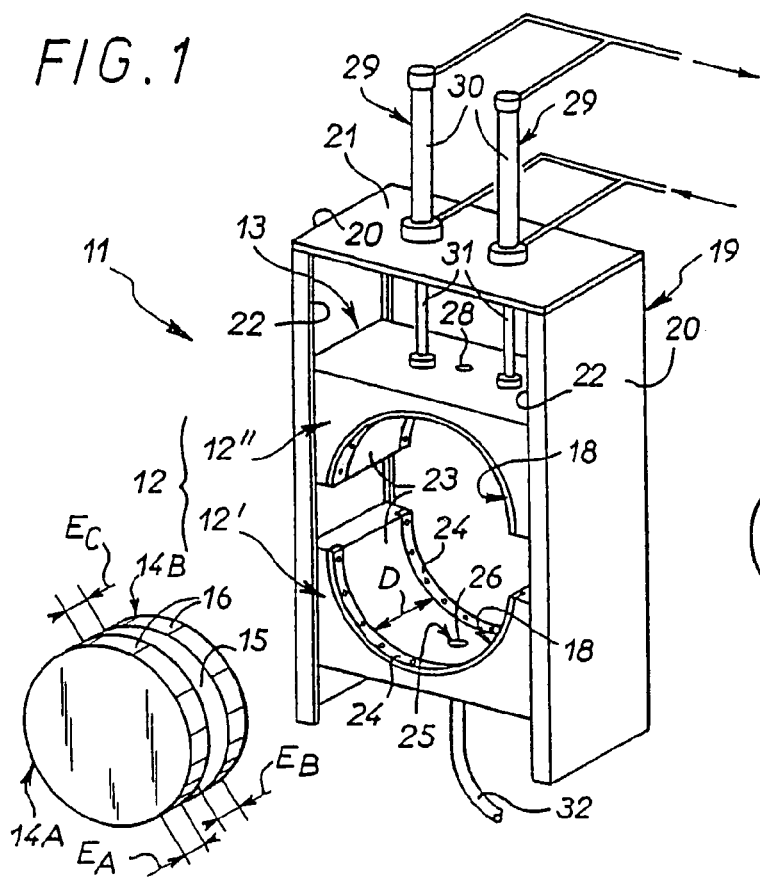
FIG. 1 is a perspective view of the device.
Figure 3:
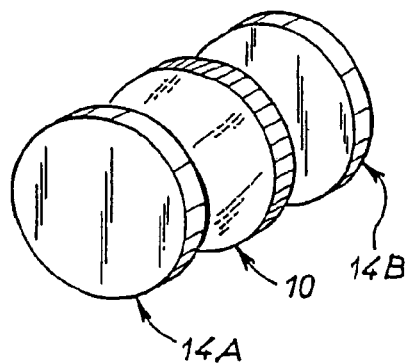
FIG. 3 is a perspective view to the same scale as FIG. 1 showing the removal from the mold of the optical lens produced by the device.
Figure 2A:
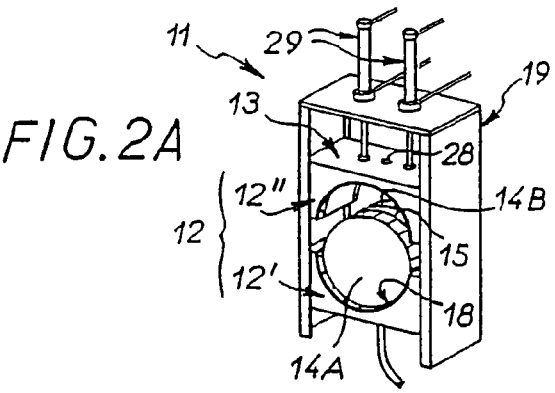
FIGS. 2A, 2B, 2C and 2D are views to a smaller scale similar to that of FIG. 1 showing successive operations of using the device.
Figure 2B:
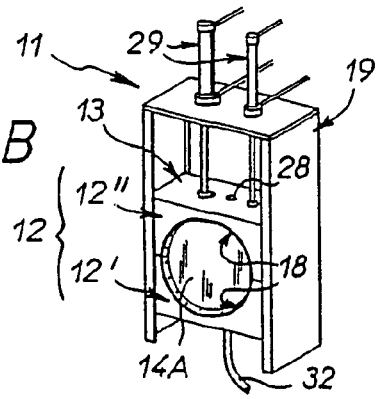
Figure 2C:
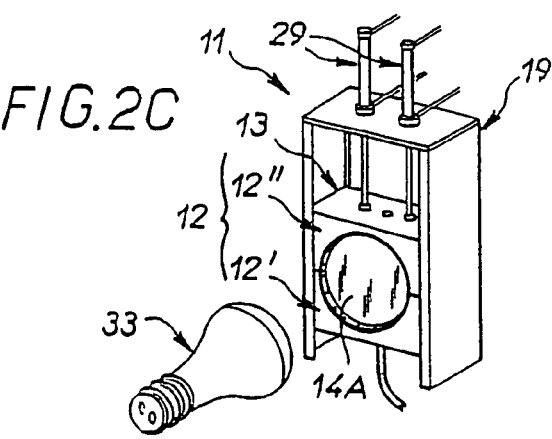
Figure 2D:
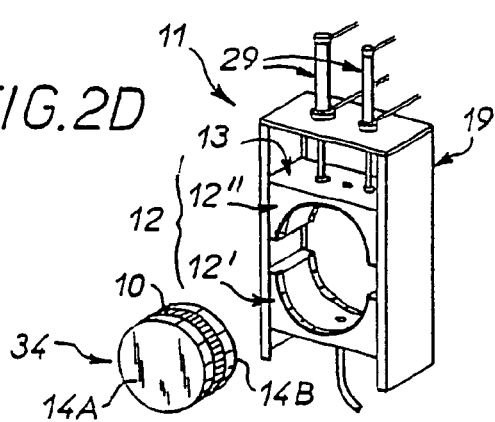
Figure 4:
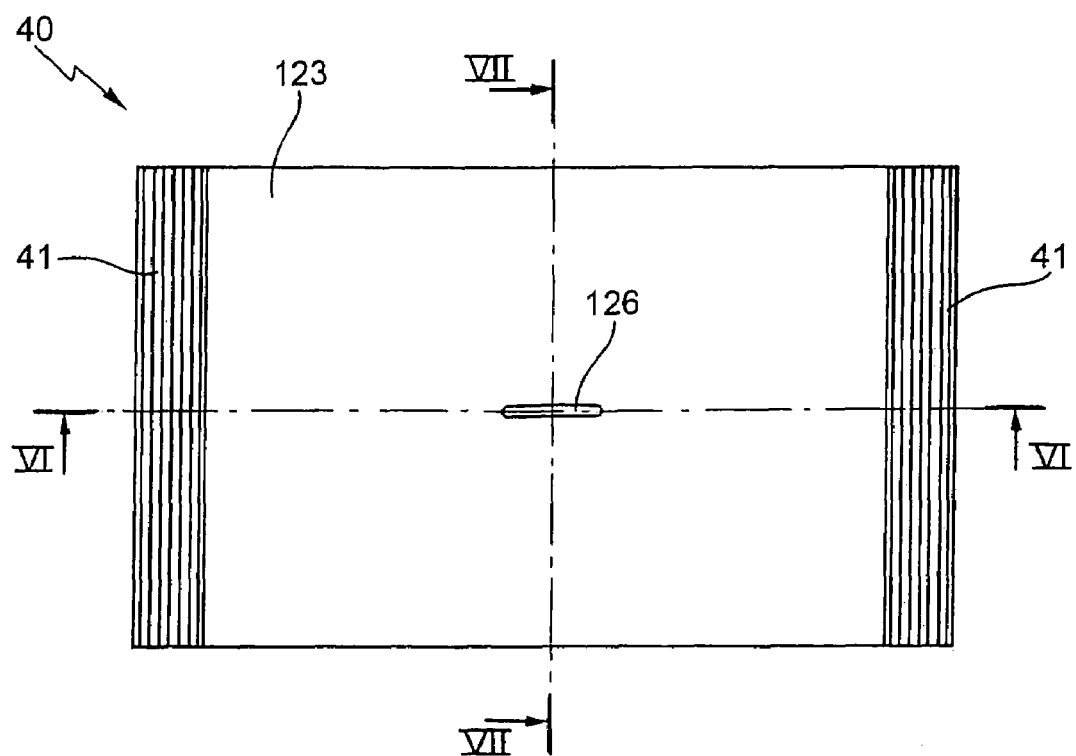
FIG. 4 is a plan view of a seal forming part of a closure member of a device of the invention, as seen from the molding cavity side.
Figure 5:
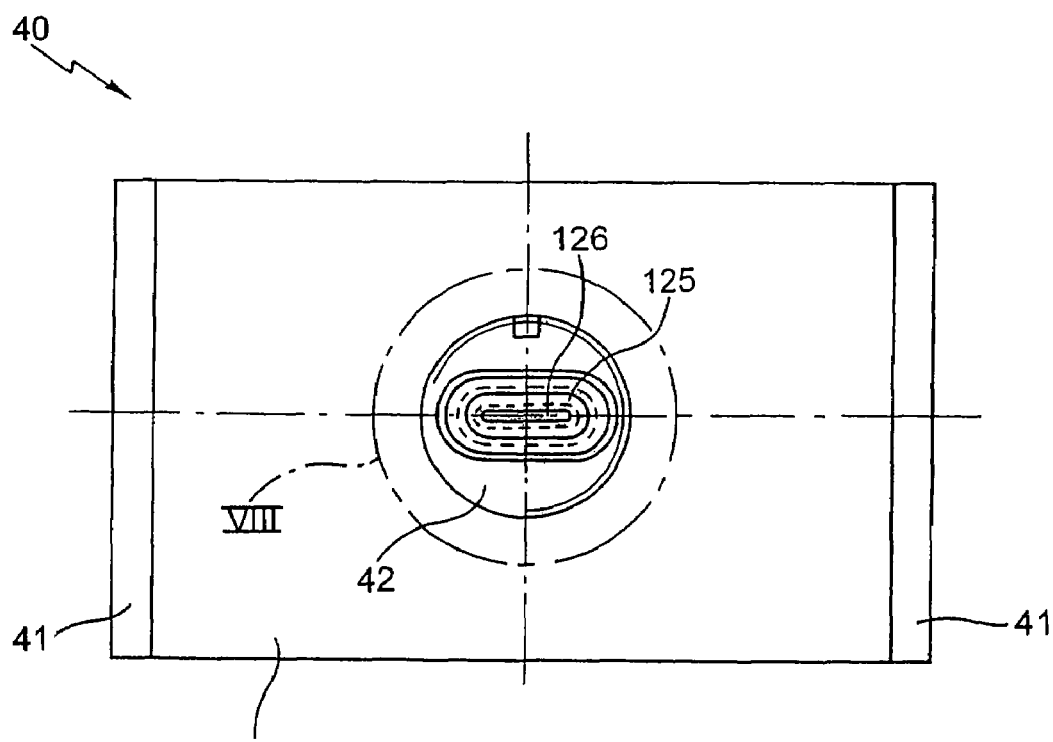
FIG. 5 is another plan view of the seal, from the opposite side.
Figure 6:
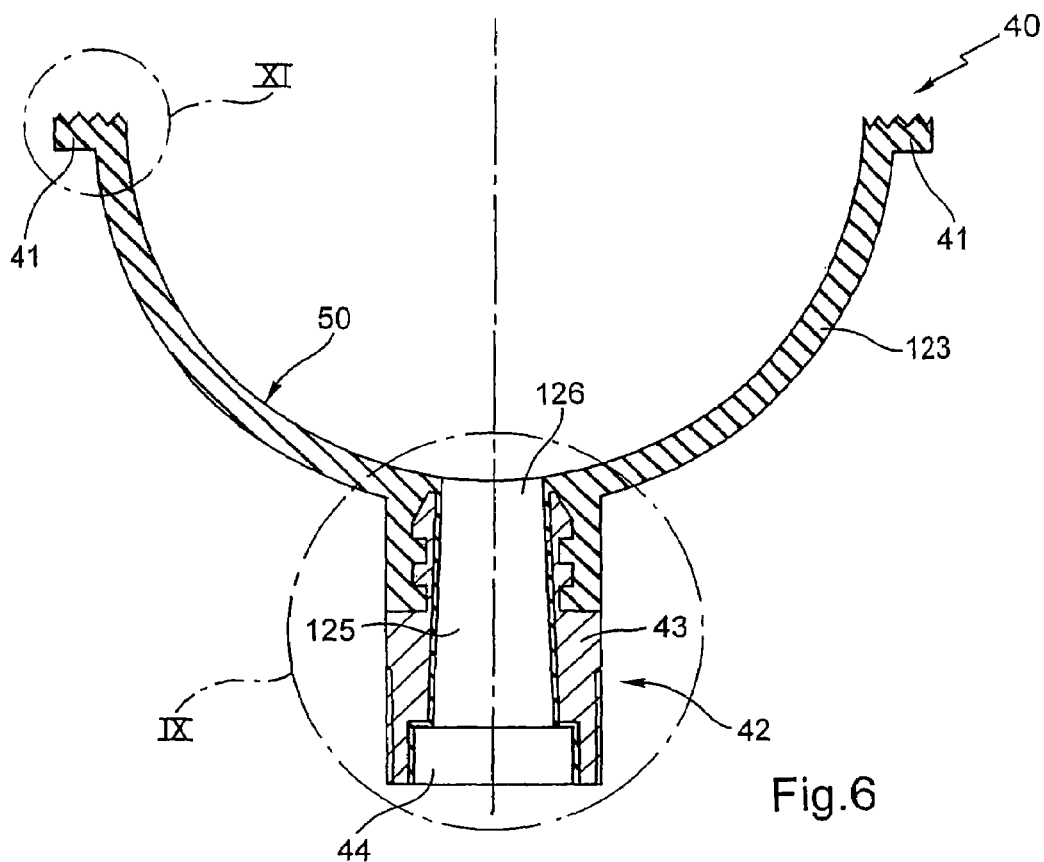
FIGS. 6 and 7 are views in section taken along the lines VI-VI and VII-VII in FIG. 4, respectively.
Figure 7:
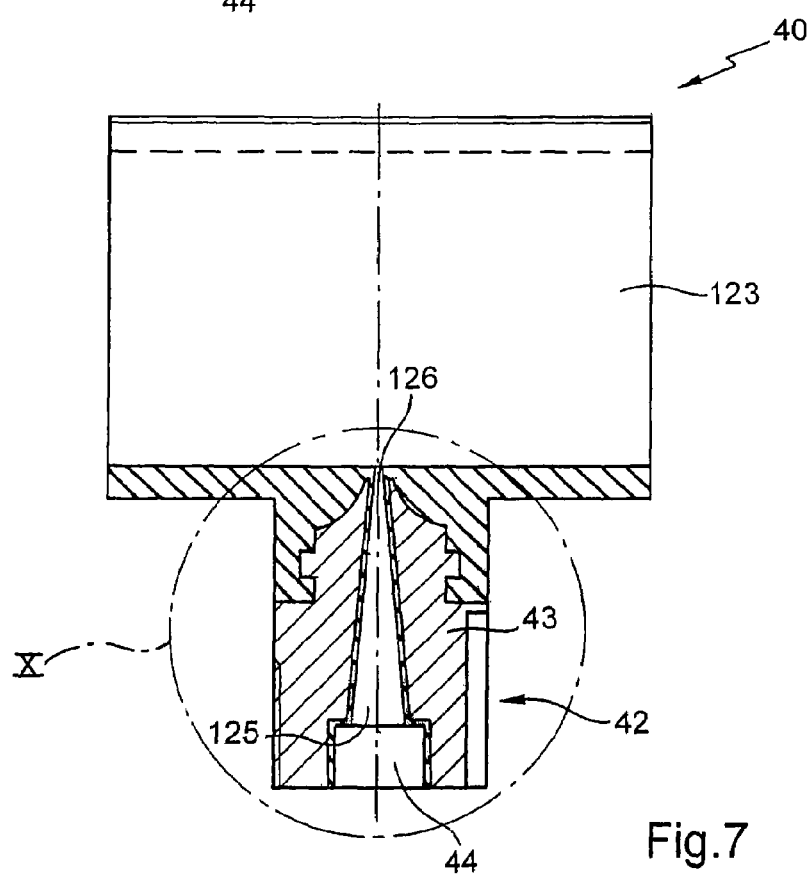
Figure 8:
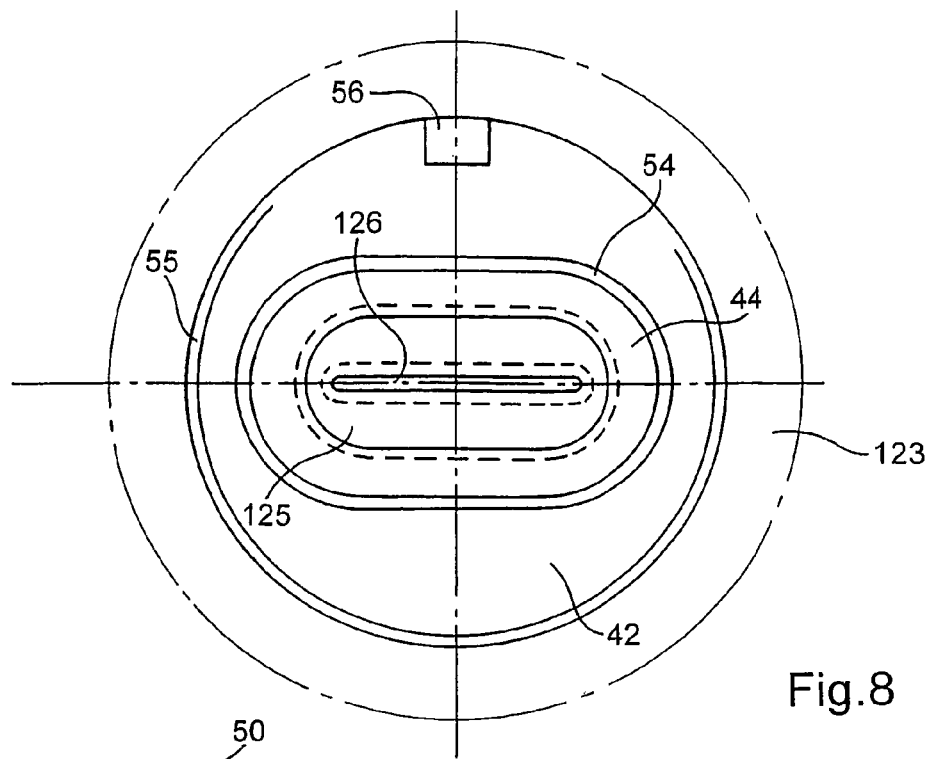
FIGS. 8 to 11 are views to a larger scale of the detail VIII in FIG. 5, the detail IX in FIG. 6, the detail X in FIG. 7 and the detail XI in FIG. 6.
Figure 9:
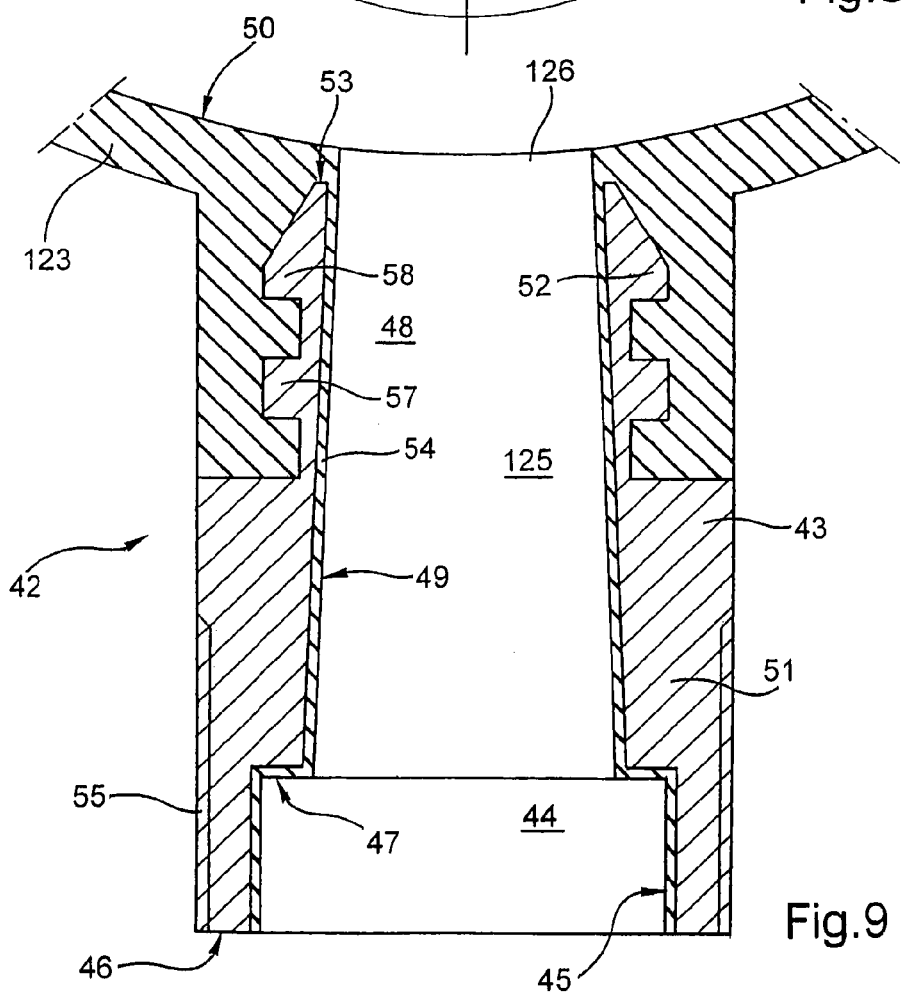
Figure 10:
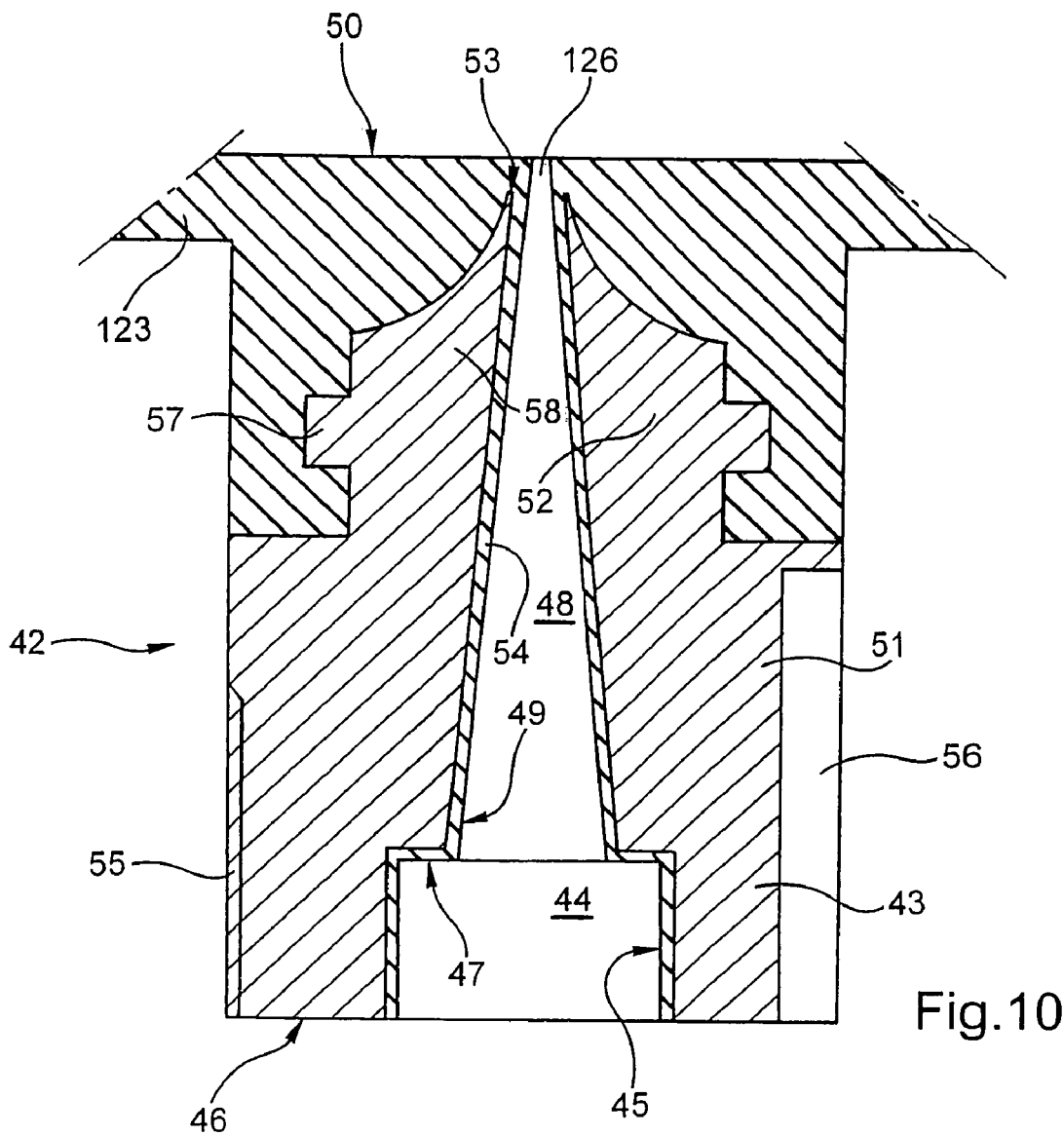

The seal 40 shown in FIGS. 4 to 11 is part of a closure member similar to the closure member 12 of the device 11 described above, and more precisely of a jaw similar to the jaw 12' but equipped with a filler device (valve and nozzle) as described in the European patent applications EP 1 440 780 and EP 1 440 788 mentioned above.

The seal 40 is adapted to be adhesively bonded to the remainder of the jaw of which it forms part, this jaw having no fixing clamps like the clamps 24.

Hereinafter, the same reference numbers are used as are used for similar components of the device 11, but increased by 100.

The seal 40 includes a body 123, two rims 41 and a stem 42. The seal 40 is made from an elastomer material and incorporates a relatively rigid material insert 43 in the stem 42, over which the elastomer material is molded.

The body 123 serves as an internal covering of the jaw of which the seal 40 forms part (a jaw similar to the jaw 12'). The body 123 therefore forms a contact wall for the shells such as 14A and 14B.

The body 123 is gutter-shaped, i.e. has a substantially constant thickness and a semicircular cross section. Here the body 123 has a length approximately three-quarters its diameter.

The rims 41 cover the rims of the jaw of which the seal 40 forms part in the same way as the body 123 covers the surface of that jaw similar to the surface 18.

The rims 41 each run along a respective rectilinear end of the body 123 along the whole length of the latter, projecting radially from the convex face of the body 123 (this face is on the opposite side to the molding cavity).

The rims 41 are substantially the same thickness as the wall that forms the body 123. The upper face of each rim 41 and the corresponding rectilinear edge of the body 123 are aligned with each other. Together they form a surface having a sawtooth section, as explained in more detail later with reference to FIG. 11.

The stem 42 has a globally cylindrical shape. It projects radially from the convex side of the body 123, i.e. the side opposite the molding cavity.

The stem 42 is disposed at the center of the body 123, i.e. at equal distances from the curved edges and at equal distances from the rectilinear ends of the body 123.

A passage 125 inside the stem 42 and through the body 123 discharges via a casting opening 126 onto the concave face of the body 123 (this face is on the molding cavity side).

The casting opening 126 is buttonhole-shaped, i.e. it is a narrow elongate opening. The opening 126 is oriented in a central transverse plane of the body 123.

Each end of the opening 126 is rounded.

Here the opening 126 has a length that is approximately 17 times its width.

This conformation and orientation of the opening 126 means that the distance $E_C$ (FIG. 1) can be particularly small, enabling an optical lens to be molded with particularly thin edges.

The end of the passage 125 opposite the casting opening 126 is adapted to be connected to polymerizable synthetic material supply means, more precisely, here, to a filler valve like that described in the European patent application EP 1 440 780 referred to above.

To this end the passage 125 has at the end opposite the opening 126 a recess 44 whose lateral surface 45 has an oblong contour.

The surface 45 extends from the lower edge 46 of the stem 42 to a shoulder surface 47.

The lateral surface 45 of the recess 44 is straight, i.e. parallel to the axis of the passage 125. The edge 46 and the shoulder surface 47 are perpendicular to the axis of the passage 125 and therefore perpendicular to the lateral surface 45.

The width of the contour of the lateral surface 45 is approximately 1.7 times its length, which is approximately 1.6 times the length of the opening 126.

The shoulder surface 47 has a constant width (i.e. a constant distance between its internal contour and its external contour), its internal contour being oblong like its external contour, which corresponds to that of the lateral wall 45.

The width of the shoulder surface 47 is of the order of one eighth of the length (greater dimension) of the recess 44.

Between the shoulder surface 47 and the casting opening 126, the passage 125 has a convergent portion 48 whose lateral wall 49 extends from the shoulder surface 47 to the concave surface 50 of the body 123.

The lateral surface 49 of the convergent portion 48 is regular, and its intersection with each section plane containing the axis of the portion 48 is therefore a straight line segment.

The recess 44 is adapted to receive a nose of the molding material supply valve having a lateral surface conformed like the surface 45 and an edge surface between the lateral surface and an outlet orifice of the valve conformed like the shoulder surface 47.

Accordingly, material ejected by the outlet orifice of the valve is conveyed toward the casting orifice 126 by the convergent portion 48.

The insert 43 is described more particularly next.

As indicated above, the insert 43 is relatively rigid. Here it is molded in one piece from a thermoplastic material.

The insert 43 includes a body 51 and a head 52.

The body 51 extends from the lower edge 46 of the stem 42 as far as the head 52, which extends from the body 51 to an upper edge 53 situated at half the thickness of the body 123.

The elastomer material is molded over only the inside the body 51 and over the whole of the head 52.

The internal surface of the insert 43 is conformed like the channel 125, an elastomer material layer 54 of constant thickness being molded over the inside of the insert 43. Here the layer 54 is relatively thin, its thickness being of the order of three quarters of the width of the casting opening 126.

The layer 54 continues as far as the lower edge 46 of the stem 42, where the body 51 and the layer 54 are flush with each other.

The body 51 forms the lateral external surface of the stem 42 over the whole of its length, i.e. from the edge 46 to the head 52.

This lateral external surface is globally cylindrical and has a screwthread 55 extending a certain distance from the edge 46. The body 51 further includes a groove 56 discharging on the same side as the edge 46, extending over a distance slightly greater than the length of the screwthread 55 (see FIGS. 7 and 10).

The head 52 includes an annular rib 57 whose diameter is smaller than the outside diameter of the body 51, with an annular groove situated between the body 51 and the annular rib 57 and a similar annular groove between the rib 57 and a spigot 58 extending from that groove to the edge 53.

The external surface of the elastomer material that surrounds the head 52 is flush with the external surface of the body 51 of the insert 43.

The screwthread 55 on the stem 42, which is provided by the insert 43, is beneficial for cooperation of the seal 40 with the jaw of which it forms part and with the valve whose nose is engaged in the recess 44.

The layer of elastomer material 54 that delimits the recess 44 enables sealed connection of the stem 42 and the valve whose nose is received in the recess 44.

Because the passage 125 and the opening 126 are produced while molding the elastomer material, their geometry and surface state can be controlled in a particularly precise and reproducible manner, which is beneficial to the quality of optical lenses molded using the closure member of which the seal 40 forms part.

The assembly of the insert 43 to the elastomer material remainder of the joint 40 is particularly reliable and strong, including the resistance to tearing out of the insert 43, which is solidly anchored in the elastomer material, thanks in particular to the two annular grooves that surround the rib 57.

Figure 11:
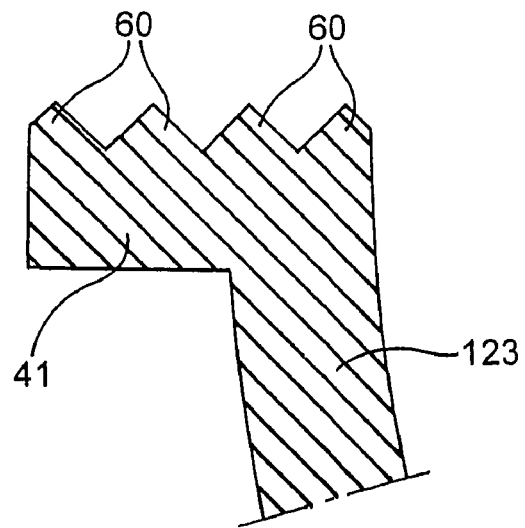

As indicated above, the upper face of each rim 41 and the corresponding rectilinear edge of the body 123 together form a surface having a sawtooth section, as seen in FIG. 11 in particular.

In the closure member incorporating the seal 40, the jaw like the jaw 12" has a seal that is globally conformed as a mirror image of the seal 40 (with vent means at its center rather than molding material supply means, of course).

In particular, the seal forming part of the jaw such as 12" has a body whose rectilinear ends are flanked by rims similar to the rims 41 with the upper face of each rim and the corresponding rectilinear edge of the body of the seal that together form a surface having a sawtooth section able to nest in the sawtooth section of the opposite surface of the seal 40.

In other words, the ribs 60 (FIG. 11) on the seal 40 are received in grooves with the same profile on the opposite seal.

The existence of the rims 41 and the conformation of the contact surfaces between the two sawtooth-section seals means that the contact area is particularly large, with the result that excellent sealing performance is achieved.

In variants that are not shown the conformation of the molding material introduction passage may be different, for example the recess 44 may be replaced by a circular contour recess or simply dispensed with; the insert 43 may be different, for example made of a rigid material, for example machined from steel, rather than made of a thermoplastic material, and/or its conformation may be different, for example longer or shorter, and/or it may cooperate differently with the elastomer material, for example by being completely molded over or having a smaller portion molded over, in particular having only a portion of its internal surface molded over; the stem 42 may be conformed differently, or there may even be no projecting stem; and/or the rims 41 may be conformed differently, or there even may be no such rims 41.

In other variants that are not shown, the seal 40 may form part of a closure member for molding optical lenses with a non-circular contour, for example an oval overall contour, and/or instead of being formed by two jaws 12' and 12", one of which is fixed and the other mobile, the closure member may be formed by an annular seal like that described in the international application WO 03/078144 referred to above, for example.

Many other variants are feasible as a function of circumstances, and in this respect it must be remembered that the invention is not limited to the examples described and shown.

The invention claimed is:

1. A device for producing a polymerizable synthetic material optical lens, comprising:
   a closure member (12) that is adapted to grip two molding shells (14A, 14B) circumferentially to define a molding cavity (15) in conjunction with said shells (14A, 14B), said closure member (12) including a synthetic material wall (123) adapted to come into contact with said molding shells (14A, 14B) and said closure member (12) incorporating a molding material introduction passage (125) discharging into the molding cavity (15) through a casting opening (126); wherein
   said closure member (12) includes a seal (40) that forms said contact wall (123) and said introduction passage (125), which seal (40) is formed of an elastomer material and of a rigid insert (43) at least part of which has said elastomer material molded over it, said introduction passage (125) being inside said insert (43), and said insert (43) has an internal surface over at least a portion of which the elastomer material is molded.

2. The device according to claim 1, wherein said casting opening (126) formed in said elastomer material is a molded casting opening.

3. The device according to claim 1, wherein said casting opening (126) is buttonhole-shaped.

4. The device according to claim 3, wherein said introduction passage (125) has a portion (48) that converges towards said casting opening (126) that is entirely delimited by elastomer material.

5. The device according to claim 1, wherein said introduction passage (125) includes a recess (44) opposite said casting opening (126) that extends to a shoulder surface (47) and a portion (48) of said shoulder surface (47) that converges to said casting opening (126).

6. The device according to claim 1, wherein said insert (43) has the internal surface over a whole of the internal surface the elastomer material is molded.

7. The device according to claim 1, wherein said insert has an internal surface over which is molded a layer (54) of elastomer material of constant thickness.

8. The device according to claim 1, wherein said seal (40) includes a body (123) forming said contact wall and a stem (42) including said insert (43) projecting from a face of said body (123) opposite said molding cavity (15).

9. The device according to claim 8, wherein said insert (43) forms at least a portion of a lateral external surface of said stem (42).

10. The device according to claim 9, wherein said portion of the lateral external wall of said stem (42) formed by said insert (43) carries a screwthread (55).

11. The device according to claim 1, wherein said insert (43) includes a body (51) over part of which said elastomer material is molded and a head (52) over a whole of the head said elastomer material is molded.

12. The device according to claim 11, wherein said head includes an annular rib (57) between two grooves.

13. The device according to claim 11, wherein said head (52) includes an end (53) half way through a thickness of a body (123) forming said contact wall.

14. The device according to claim 1, wherein said seal includes a gutter-shaped body (123) forming said contact wall and rims (41) each flanking a respective rectilinear end of said body (123) and projecting radially from a face opposite said molding cavity (15).

15. The device according to claim 14, wherein each of said rims (41) has a face aligned with an edge of said body (123), said face and said edge together forming a surface having a sawtooth section.

16. The device according to claim 2, wherein said casting opening (126) is buttonhole-shaped.

17. The device according to claim 12, wherein said head (52) includes an end (53) half way through a thickness of a body (123) forming said contact wall.

18. The device according to claim 1, wherein said rigid insert (43) is formed from a thermoplastic material, said rigid insert (43) includes a body (51) and a head (53), and said elastomer material is molded only an inside of the body (51) and over a whole of the head (53).

19. The device according to claim 1, wherein said rigid insert (43) is machined from steel, said rigid insert (43) includes a body (51) and a head (53), and said elastomer material is molded only an inside of the body (51) and over a whole of the head (53).

20. A device for producing a polymerizable synthetic material optical lens, comprising:

a molding cavity (15);

two molding shells (14a, 14b); and a closure member (12) that is adapted to grip the two molding shells (14A, 14B) circumferentially to define the molding cavity (15) in conjunction with said molding shells (14A, 14B), said closure member (12) including a synthetic material wall (123) adapted to come into contact with said molding shells (14A, 14B) and said closure member (12) incorporating a molding material introduction passage (125) discharging into the molding cavity (15) through a casting opening (126), wherein said closure member (12) includes a seal (40) that forms said material wall (123) and said introduction passage (125), which seal (40) is formed of an elastomer material and of a rigid insert (43) at least part of which has said elastomer material molded over it, said introduction passage (125) being inside said insert (43), said seal (40) including a body (123) forming said material wall and a stem (42) including said insert (43) projecting from a face of said body (123) opposite said molding cavity (15), said rigid insert (43) is formed from a thermoplastic material or is machined from steel, said rigid insert (43) including a body (51) and a head (53), and said elastomer material is molded only an inside of the body (51) and over a whole of the head (53).

* * * * *